US012613070B2

(12) United States Patent
Marquis

(10) Patent No.: US 12,613,070 B2
(45) Date of Patent: Apr. 28, 2026

(54) LAYERED RADIATOR FOR EFFICIENT HEAT REJECTION

(71) Applicant: Kyle Borden Marquis, San Jose, CA (US)

(72) Inventor: Kyle Borden Marquis, San Jose, CA (US)

( * ) Notice: Subject to any disclaimer, the term of this patent is extended or adjusted under 35 U.S.C. 154(b) by 3 days.

(21) Appl. No.: 18/634,965

(22) Filed: Apr. 14, 2024

(65) Prior Publication Data

US 2024/0255243 A1     Aug. 1, 2024

Related U.S. Application Data

(63) Continuation of application No. 17/385,920, filed on Jul. 27, 2021, now Pat. No. 12,038,241.

(60) Provisional application No. 63/057,712, filed on Jul. 28, 2020.

(51) Int. Cl.
*F28F 21/02*     (2006.01)
*B64G 1/50*      (2006.01)
*F28F 13/00*     (2006.01)

(52) U.S. Cl.
CPC .............. *F28F 21/02* (2013.01); *B64G 1/503* (2013.01); *F28F 2013/001* (2013.01); *F28F 2275/025* (2013.01); *F28F 2275/08* (2013.01)

(58) Field of Classification Search
CPC ................. F28F 21/02; F28F 2013/001; F28F 2275/025; F28F 2275/08; B64G 1/503
See application file for complete search history.

(56) References Cited

U.S. PATENT DOCUMENTS

| | | | |
|---|---|---|---|
| 4,133,376 | A | 1/1979 | Eilenberg et al. |
| 5,069,274 | A | 12/1991 | Haslett et al. |
| 6,776,220 | B1 | 8/2004 | Low et al. |
| 6,883,592 | B2 | 4/2005 | Lee |
| 7,040,388 | B1 | 5/2006 | Sato et al. |
| 7,215,545 | B1 | 5/2007 | Moghaddam et al. |
| 7,256,996 | B2 | 8/2007 | Egbert et al. |
| 7,321,494 | B2 | 1/2008 | Han |
| 7,430,121 | B2 | 9/2008 | Lu et al. |
| 7,509,997 | B2 | 3/2009 | Lin et al. |
| 7,564,689 | B1 | 7/2009 | Guo et al. |
| 7,889,503 | B2 | 2/2011 | Nagareda et al. |

(Continued)

OTHER PUBLICATIONS

Haller et al, "Heat-Rejection And Weight Characteristics Of Fin-Tube Space Radiators With Tapered Fins", NASA Technical Note, NASA TN D-2168, Feb. 1964.

(Continued)

*Primary Examiner* — Kristina N Junge
(74) *Attorney, Agent, or Firm* — Larsen IP PLLC; James C. Larsen

(57) ABSTRACT

A radiator assembly having a plurality of thermally conductive layers arranged in a stack of layers and a heat transfer clamping bracket operably coupled to a first end of the layers of the stack, the clamping bracket being configured to deliver heat from a heat source to the layers. Each stack of layers has a tapered overall shape in cross section due to sequentially shorter lengths of the thermally conductive layers exposing a second end of each layer to a surrounding environment for heat rejection, a total thickness of the stack diminishing with distance away from said heat transfer clamping bracket.

21 Claims, 3 Drawing Sheets

(56) References Cited

U.S. PATENT DOCUMENTS

| | | | |
|---|---|---|---|
| 7,929,309 B2 | 4/2011 | Zhao et al. | |
| 7,969,742 B2 | 6/2011 | Liu | |
| 8,077,465 B2 | 12/2011 | Chang et al. | |
| 8,081,470 B2 | 12/2011 | Oki et al. | |
| 8,081,477 B2 | 12/2011 | Yang et al. | |
| 8,087,456 B2 | 1/2012 | Wei | |
| 8,157,217 B1 | 4/2012 | Anderson | |
| 8,230,910 B2 | 7/2012 | Bielesch et al. | |
| 10,101,099 B2 * | 10/2018 | Benthem ................. | B64G 1/58 |
| 11,333,445 B1 | 5/2022 | Milkie et al. | |
| 12,038,241 B2 * | 7/2024 | Marquis ................... | F28F 3/12 |
| 2011/0277959 A1 | 11/2011 | Morin et al. | |
| 2019/0331437 A1 * | 10/2019 | Jinnoh ...................... | A61F 7/02 |

OTHER PUBLICATIONS

Maas, "Development of Pyrolytic Graphite Applications in Spacecraft Thermal Control Systems", 47th International Conference on Environmental Systems, ICES-2017-107, Jul. 16-20, 2017, Charleston South Carolina, 14 pgs.
Van Lierop, "Deployable Radiator Wing for High-performance CubeSats: Designing, analysing, prototyping and testing", masters thesis 2021 Delft University of Technology, Netherlands, pp. 11-25, 43-44.
Kraus et al., "Extended Surface Heat Transfer", Chapter 13, Dec. 22, 2000, John Wiling & Sons, Inc., New York.

* cited by examiner

LAYERED RADIATOR FOR EFFICIENT HEAT REJECTION

CROSS-REFERENCE TO RELATED APPLICATIONS

This application is a continuation of co-pending U.S. patent application Ser. No. 17/385,920 filed Jul. 27, 2021, which claims benefit of U.S. Provisional Patent Application No. 63/057,712, filed Aug. 28, 2020, each of which is incorporated herein by reference thereto.

BACKGROUND

This disclosure relates generally to the field of thermal management, and more specifically to radiators which transfer heat from a work piece to the surrounding environment. For example, radiators may be used to reject heat from spacecraft.

Radiators are commonly made from sandwich panels consisting of top and bottom skin layers, as well as support material in the center. This approach keeps the structure rigid while being lightweight, since the skin layers are far apart, thus increasing the "area moment of inertia" and reducing bending motion. Radiators will commonly have tubes or pipes running inside the structure delivering heat from the surface exposed to the surrounding environment. These radiators are not optimized to deliver the most amount of heat per unit mass and are typically heavy and are, therefore, impractical for certain applications, such as spacecraft. Accordingly, there is a need to develop lighter and higher heat rejection capabilities to reduce the mass of spacecraft.

In recent years there have been calls for spacecraft that have large heat rejection capabilities with minimal mass. As technology enables more powerful computing and smaller sensors, spacecraft have become more and more compact and consequently power dense. Without an ability to remove this power generated onboard, such a spacecraft would increase in temperature until a new thermal equilibrium is reached. However, sensors and equipment typically perform with reduced life, speed, and/or reliability at such higher temperatures. Accordingly, spacecraft designers seek ways to remove or reduce this heat without having significantly high temperatures within the spacecraft.

Common radiators use aluminum as the material transferring heat to a surface, often with a coating to improve emissivity and add the ability for a surface to admit rather than reflect radiation. By using pyrolytic graphite layers, the thermal conductivity can reach up to 1950 watts per meter Kelvin whereas aluminum might reach 230 watts per meter Kelvin. By having a large thermal conductivity, a radiator provides less resistance for heat to flow, allowing for higher performance of heat rejection per unit mass. Furthermore, graphite is less dense than aluminum, enabling a lighter radiator as well.

Heat pipes, heat straps, and pumped fluid loops are all used to transfer heat to a radiator on a spacecraft, but for the purposes of this design, what matters is that there is some means of delivering heat to the radiator, hereby referred to as the source of heat.

There has been a lack of research into how best to utilize these layers for the most efficient heat transfer per unit mass. Solid rectangular profiles, as evidenced by the current technology sandwich panels, do achieve good heat rejection abilities. However, the additional mass at the section furthest from the source of heat is not providing the same usefulness as the mass that is closest to the heat source. This is because as heat travels away from its source, it reduces in temperature through conductive resistance. Since heating from radiation depends proportionally to the temperature of the section of surface to the power of 4, a small reduction in temperature can lead to significantly less radiative heat transfer leaving that section. Consequently, as the radiator material gets further from the source, its ability to reject heat lowers, reducing the efficiency of heat per unit mass of the system. However, the concept of tapering a heat transfer device has significant history in the field of heat sinks and fin design; heat transfer textbooks go into detail for this topic. For radiators, however, there is little research.

SUMMARY OF THE DISCLOSURE

Those having skill in the art will recognize that disclosed embodiments need not be limited to spacecraft applications; other applications might include removing heat from plants that generate or transfer power for terrestrial or interplanetary purposes. Here, heat rejection is defined as the process of disposing of acquired energy, or "waste heat," to maintain systems within the required temperature limits for operation.

According to an embodiment, a radiator includes at least two thermally conductive layers arranged in a stack of layers, and a heat transfer clamping bracket operably coupled to a first end of the layers of the stack and configured to deliver heat from a heat source to the layers. The stack of layers may have a tapered overall shape in cross section due to sequentially shorter lengths of the thermally conductive layers exposing a second end of each layer to a surrounding environment for heat rejection. A total thickness of the stack diminishes with distance away from the heat transfer clamping bracket. The thermally conductive layers may be disposed having a distance less than 400 μm between adjacent thermally conductive layers.

According to an embodiment, a radiator includes at least two thermally conductive layers arranged in a stack of layers and a heat transfer clamping bracket operably coupled to a first end of the layers of the stack and configured to deliver heat from a heat source to the layers. The stack of layers may have a tapered overall shape in cross section due to sequentially shorter lengths of the thermally conductive layers exposing a second end of each layer to a surrounding environment for heat rejection. A total thickness of the stack diminishes with distance away from the heat transfer clamping bracket. The stack of layers includes a number of the thermally conductive layers, arranged on respective sides of one or more central layers in a mutually tapered cross section. In this arrangement a length of the one or more central layers of the thermally conductive layers is longer, from the first end of the one or more central layers to the second end of the one or more central layers, than a length of adjacent layers, of the thermally conductive layers arranged on respective sides of the one or more central layers.

According to an embodiment, a radiator includes at least two thermally conductive layers arranged in a stack of layers and a heat transfer clamping bracket. The heat transfer clamping bracket may be operably coupled to a first end of the layers of the stack and configured to deliver heat from a heat source to the layers. The heat clamping bracket may have a heat source receiving portion configured to thermally couple with a heat source. The heat transfer clamping bracket may be configured to clamp the layers together proximal to the heat source. The stack of layers may have a tapered overall shape in cross section due to sequentially shorter lengths of the thermally conductive layers exposing a second end of each layer to a surrounding environment for heat rejection. A total thickness of the stack diminishes with distance away from the heat transfer clamping bracket.

DETAILED DESCRIPTION

Figures 1, 2, 2A, 2B, 2C:
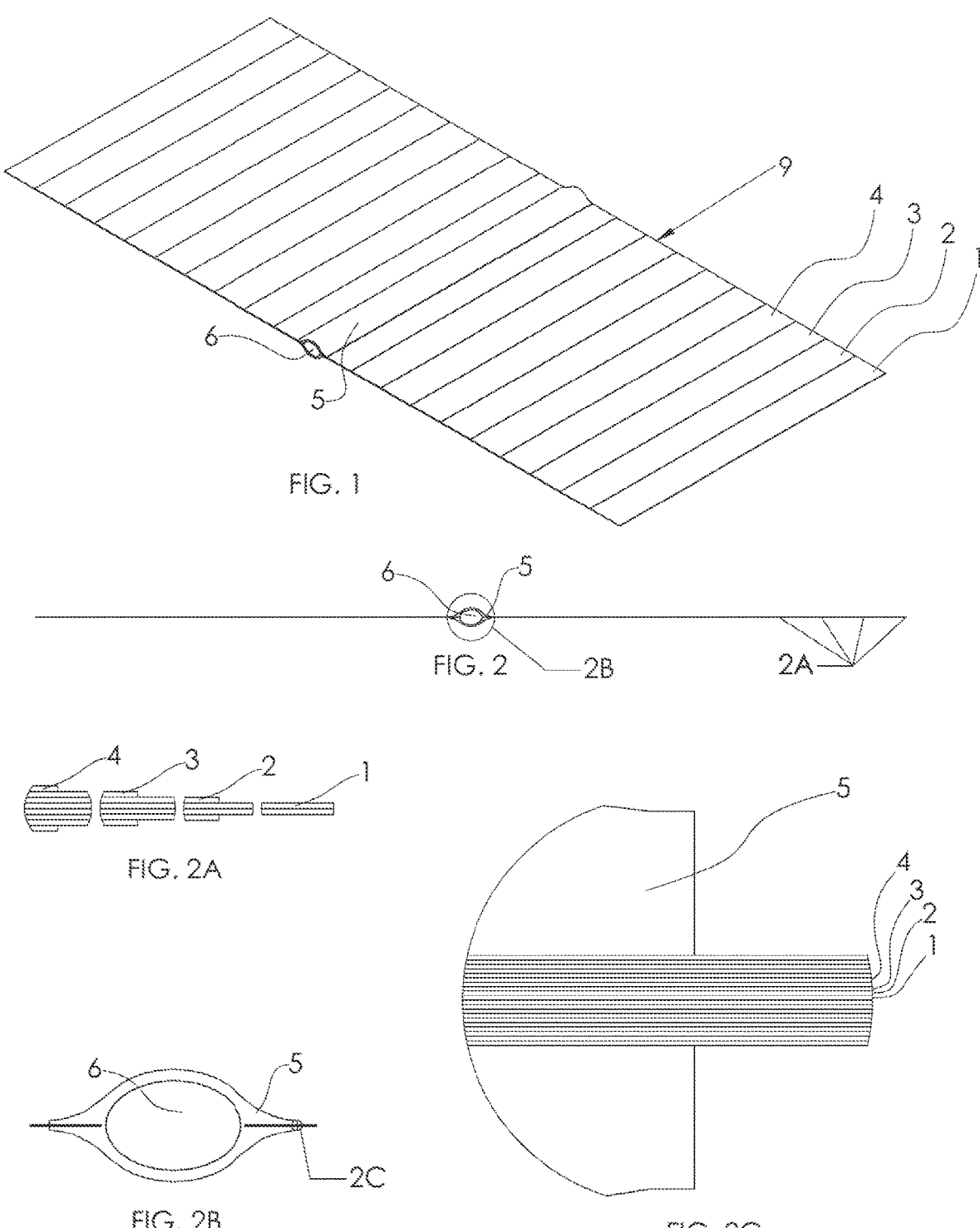
FIG. 1 is a perspective view of a multiple-sided radiator.
FIG. 2 is a side view of a multiple-sided radiator.
FIG. 2A is a detailed view of the last 4 layers of a single side of the radiator from FIG. 2.
FIG. 2B is a detailed view of a clamping bracket attached to the layers of the radiator from FIG. 2 along with a source of heat.
FIG. 2C is a detailed view of the radiator's layers' connection to the clamping bracket from FIG. 2B.

FIG. 1 shows a perspective view of a multiple-sided tapered radiator assembly, referred to as the first embodiment, or just the radiator, 9. This image shows the tapered, layered, thermally conductive sheets, also referred to herein as layers or thermally conductive layers, where the last four layers are labeled 1, 2, 3, and 4. It also includes a clamping bracket 5 that both holds the layers together and transfers heat to the layers from a source of heat. The clamping bracket 5 may include a channel 6 for receiving the source of heat. It should be noted that this design assumes radiation occurs from both top and bottom layered surfaces, although some applications would only use one side. If this is the case, one could consider using just the top half of the layers, still tapered, just not symmetric. As has been mentioned previously, other linear, or non-linear curves that the taper follows could also work. Here, the radiator assembly is shown to be around 200 mm wide. However, since the radiator assembly is here depicted having a constant cross-section, the width dimension could be changed to whatever is necessary for the application. The radiator assembly does not need to have a constant cross-section, however.

FIG. 2 shows a front view of this embodiment. The clamping bracket 5 can be seen in the center section, and the layered sections can be seen on either side. Because the layers of this radiator are very thin and long, a zoomed-in detailed view is required.

FIG. 2A shows how the arrangement layers 1, 2, 3, 4 tapers. FIG. 2A depicts breaks in between the lengths of the layers for efficiency of scale. According to an embodiment, the layers (e.g., 1, 2, 3, 4) may each be 10 μm thick. The layers may be made of pyrolytic graphite with in-plane thermal conductivity of approximately 1950 W/(m*K), with multiple layers per quadrant. According to an embodiment, there may be 10 layers per quadrant. However, those having skill in the art will acknowledge that the arrangement, or stack, of layers may have different sizes, and use different materials. The tapering effect reduces mass towards the sections that are further from the heat source, which is important in optimizing for heat per unit mass of any radiator.

FIG. 2B shows the clamping bracket 5 and shows it in contact with the layers in between it. This contact is important for the function of this device because the heat source in the channel 6 requires a pathway to conduct heat through the bracket 5, and into the layers which distribute the heat horizontally. This contact is emphasized in the detailed view, FIG. 2C. The bracket 5 services at least two purposes: securing/holding the layers, and transferring heat to the layers. According to an embodiment, the clamping bracket 5 may be made from aluminum 1050-H14, 22 mm wide, 10 mm tall, in an oval internal cross-section. However, those having skill in the art will recognize that other materials, dimensions, and cross-sections may be used within the scope of the disclosure. The clamping bracket 5 surrounds a heat source in the channel 6 to deliver heat from the heat source to the thermally conductive layers (e.g., 1, 2, 3, 4).

FIG. 2C shows a detailed view of the clamping bracket 5, which transfers heat from the heat source in the channel 6 to the thermally conducting layers through conductive heat transfer. The layers are all clamped together, and the furthest four layers 1, 2, 3, 4 of the top right quadrant of the radiator can be seen near the center of FIG. 2C. To reduce thermal resistance (reducing a drop in temperature) heat transfer requires a larger surface area for materials or geometries that are less conductive, such as the aluminum clamping bracket 5. In addition, the thermally conductive layers have a much lower thermal conductivity in out-of-plane directions. For example, they may have a thermal conductivity of approximately 14 W/(m*K). These combined factors are the reason why the area of thermal contact is much larger than the total combined thickness of the layers.

Figures 3, 3A, 4, 4A, 4B:
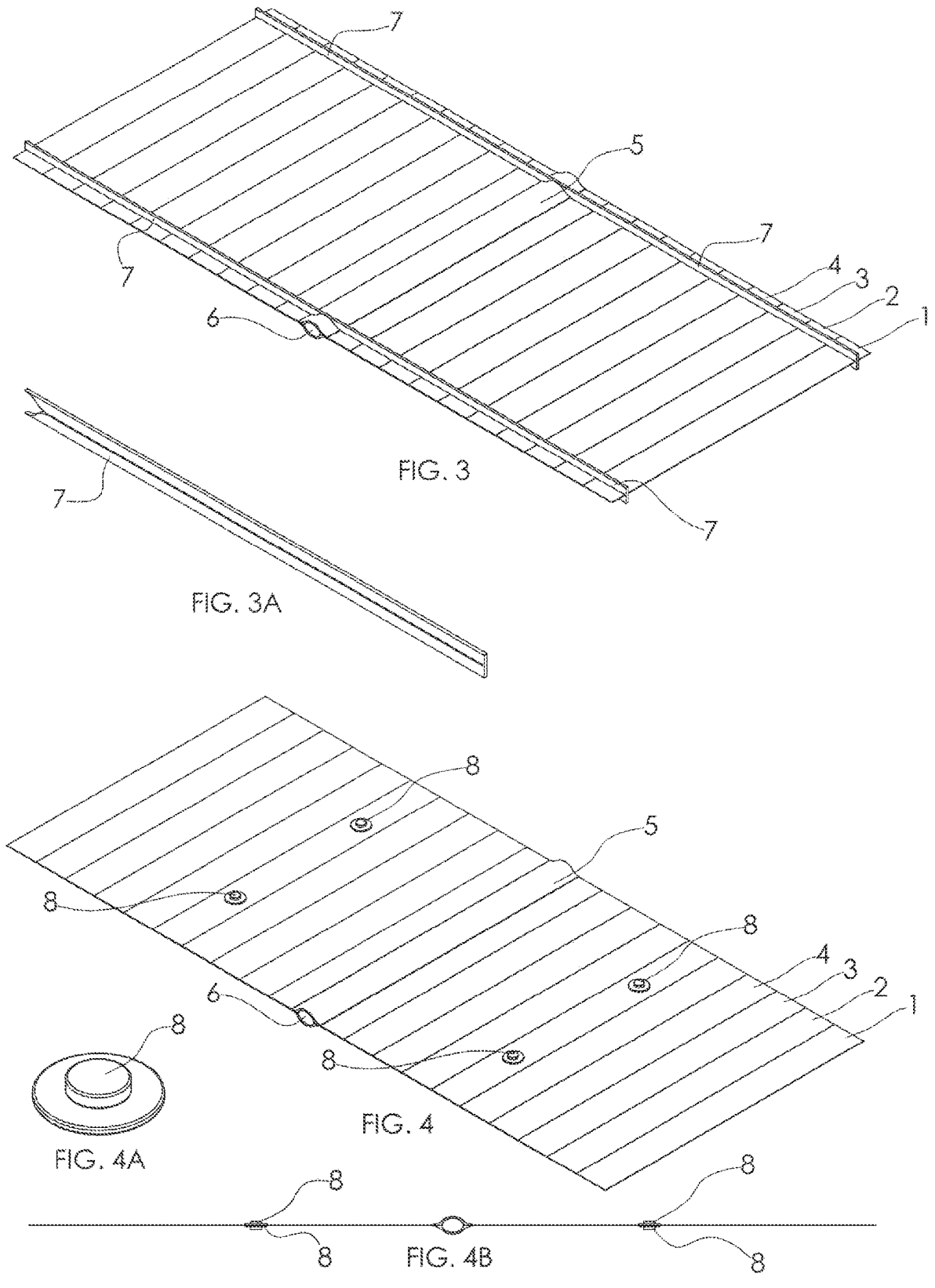
FIG. 3 is a perspective view of a multiple-sided radiator with structural supports.
FIG. 3A is a perspective view of a structural supporting bracket.
FIG. 4 is a perspective view of a multiple-sided radiator with disks compressing the layers together.
FIG. 4A is a disk used to compress layers together.
FIG. 4B is a front view of a multiple-sided radiator with disks compressing the layers.

FIG. 3 shows a radiator assembly according to another embodiment in which the radiator assembly 9 additionally includes a structural supporting bracket 7 disposed to maintain rigidity of the layers (e.g., 1, 2, 3, 4). The thermally conducting layers 1, 2, 3, 4, etc. may be thin and flexible, such that the supporting bracket(s) 7 maintain the position of the layers. In FIG. 3 the structural supporting bracket(s) 7 are shown attached to the clamping bracket 5. However, other means of supporting the structural supporting bracket(s) 7 are contemplated. For example, structural supporting bracket(s) 7 may be affixed to a separate surface (e.g., a spacecraft) and attached to the external surface of the radiator assembly 9. In this manner the supporting bracket(s) 7 may be used to position the layers of the radiator assembly in place and prevent any motion due to forces or accelerations. FIG. 3A provides a perspective view of a structural supporting bracket 7.

FIG. 4 illustrates a radiator assembly according to yet another embodiment, in which the radiator assembly (e.g., 9) includes one or more fixing devices 8, each disposed on a surface of a layer, affixing plural thermally conductive layers together. The fixing devices 8 may include adhesive and/or use of compression forces created externally from the layers. The function of the fixing device 8 is both to ensure that thermally conductive layers do not separate and to enable thermal contact between layers for sufficient heat transfer.

FIG. 4A shows a perspective view of a single fixing device 8. Although the fixing device 8 as shown may use magnets on multiple sides to create the compression loads, those having skill in the art will acknowledge this is one of several alternative means for performing this task. Other embodiments of each fixing device 8 may include grommets, clamps, or other fasteners as means for compressing thermally conductive (and any intermediate) layers. Other sizes, materials, placements, or means of connecting layers together could also be used instead of fixing device 8.

FIG. 4B shows a front view of the embodiment, illustrating that fixing devices 8 that hold the layers together may be disposed on opposite sides of a stack of thermally conductive layers.

Figures 5, 6:
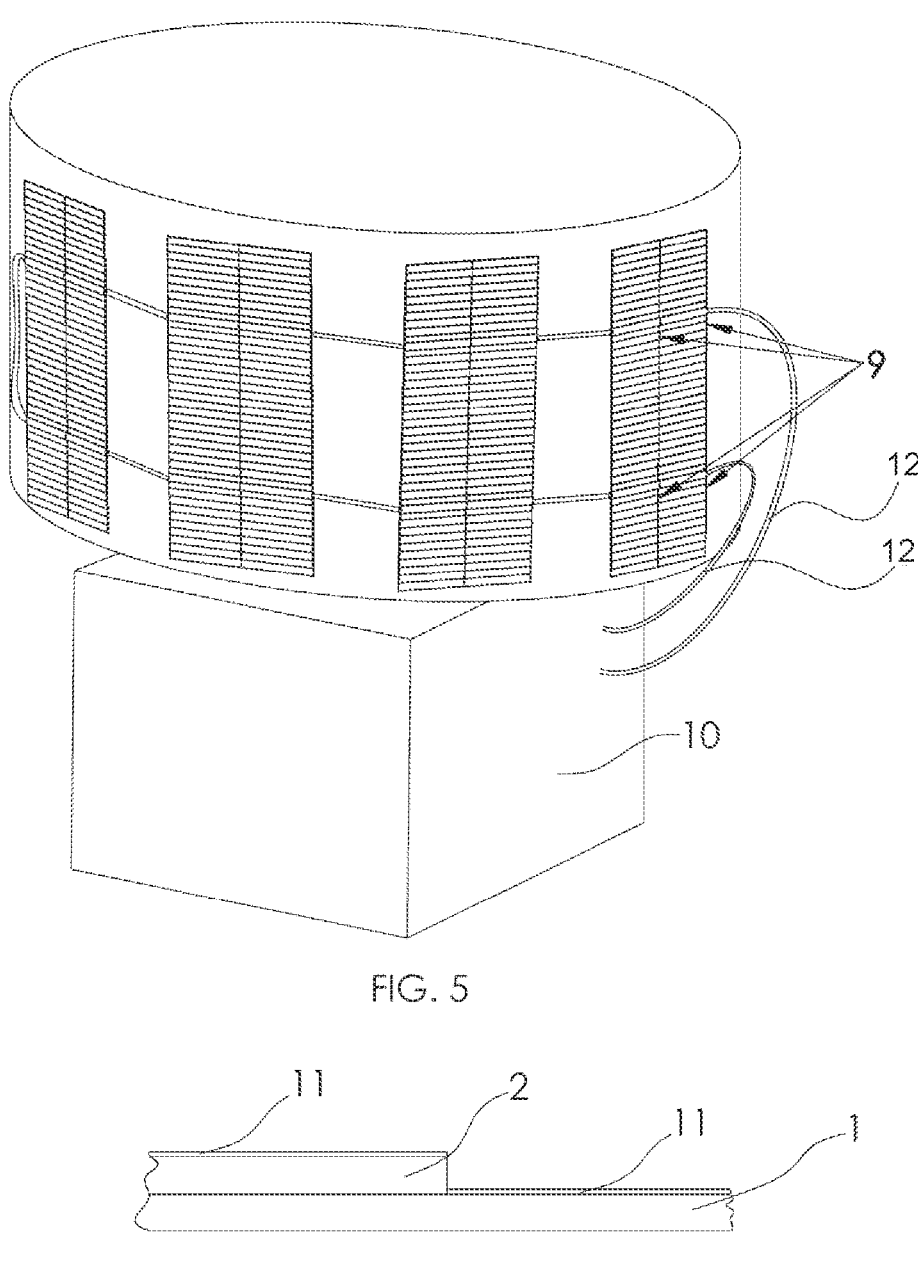
FIG. 5 is a perspective view of a spacecraft with several connected radiator assemblies along with tubes to transport the heat to those radiators.
FIG. 6 is a detailed view of tapered radiator layers with a layer or coating to increase the surface's emissivity.

FIG. 5 illustrates use of the first embodiment, assembly 9, on an object (e.g., a spacecraft). Radiator assemblies 9 are connected and placed side by side, here in clusters of four. Tubes 12 direct heat from a source of heat, running through the channels 6 of each radiator assembly 9 of the cluster to transfers heat to the thermally conductive layers. According to an embodiment, a spacecraft 10 may have a cylindrical surface to which the radiators attach. However, the inventor contemplates that radiator assemblies could alternatively or additionally be deployed from a mechanism, could be free-floating, or could be otherwise attached. A source of heat may convey heat from the spacecraft which may then be transferred to the radiators via the channels 6. In the illustration, front faces of the radiators may primarily be used for radiation, as these outwardly facing faces are exposed to the environment. Other applications may more fully utilize both sides (top and bottom) of the radiator assembly for heat radiation.

FIG. 6 shows a front detailed view of just two example layers, 1, and 2, tapered, and having a heat-emission layer or coating, 11, on the radiating surfaces. This additional layer 11 may be used to increase radiation by having an emissivity larger than the conductive layers themselves. This emission layer or coating 11 can itself be adhesive, or may include a sublayer to connect to the thermally conductive layers below.

REFERENCE NUMERALS 1-4 thermally conductive layers
  1 furthest layer
  2 second from furthest layer
  3 third from furthest layer
  4 fourth from furthest layer
5 clamping bracket
6 channel
7 structural supporting bracket
8 fixing device to hold layers together
9 radiator assembly
10 spacecraft
11 heat-emission layer or coating with or without adhesive
12 tubes

Operation

In operation, the embodiments detailed above are employed by providing a source of heat, also known as a means of delivering heat, which transfers this heat to the radiating layers. This means of delivering heat may be accomplished by using heat pipes (e.g., tubes 12), pumped fluid loops, or even through the means of conduction of a solid material. A clamping bracket 5 that clamps a plurality or stack of thermally conductive layers together can be used to support the thermally conductive layers (e.g., 1, 2, 3, 4), but also connect them to the means of delivering heat.

The thermally conductive layers need to face a cooler temperature in the surrounding environment for radiative heat transfer to remove heat from the thermally conductive layers. In the presence of an atmosphere, convection could also play a role in transferring heat along with radiation.

To position a radiator assembly, various means of attachment could be used for fixing the radiator assembly to an assigned, fixed location. The use of supporting brackets, walls, straps, cords, adhesives, fasteners, and/or a pressurized tube that maintains tension could be incorporated to keep a radiator assembly in a specified location.

Structural supports (e.g., structural supporting bracket 7) that prevent out-of-plane motion of the layers may be used by connecting a member that holds the layers to a separate more rigid member, therefore reducing motion when forces are applied.

Tapered and layered radiator embodiments may be used to reject a large amount of heat for minimal mass. Thermally conducting (and other) layers of a radiator assembly may in some embodiments be held together by structural supports and/or other mechanisms to withstand forces that may act to displace the thermally conductive layers. A spacecraft which uses a disclosed radiator assembly may benefit from the lower mass, on the order of many kilograms lower versus traditional sandwich panel radiator designs. Furthermore, each disclosed radiator assembly embodiment may be connected with one or more other radiator assemblies to reject more heat than when used individually.

Although the description above contains many specificities, these should not be construed as limiting the scope of the embodiments but as merely providing illustrations of some of several embodiments. For example, the structure supporting the radiator layers can come in many shapes or connect to other structures; the source of heat can come from a wall instead of a tube; the layers can be non-symmetric and different sizes, etc.

Thus, the scope of the embodiments should be determined by the appended claims and their legal equivalents, rather than by the examples given.

What is claimed is:

1. A radiator comprising:

at least two thermally conductive layers arranged in a stack of layers; and a heat transfer clamping bracket operably coupled to a first end of the layers of the stack and configured to deliver heat from a heat source to said layers, wherein the stack of layers has a tapered overall shape in cross section due to sequentially shorter lengths of the thermally conductive layers exposing a second end of each layer to a surrounding environment for heat rejection, a total thickness of the stack diminishing with distance away from said heat transfer clamping bracket, and the stack of layers includes a number of the thermally conductive layers arranged on respective sides of one or more central layers, in a mutually tapered cross section such that a length of the one or more central layers of the thermally conductive layers is longer, from the first end of the one or more central layers to the second end of the one or more central layers, than a length of adjacent layers, of the thermally conductive layers arranged on respective sides of the one or more central layers.

2. The radiator according to claim 1, wherein the thermally conductive layers arranged on respective sides of the central layer include at least one pair of thermally conductive layers arranged symmetrically about the one or more central layers and having a common length with each other.

3. The radiator according to claim 1, further comprising a heat-emission layer wherein the heat-emission layer has an exposed surface with an emissivity of at least 0.7.

4. The radiator according to claim 3, further comprising an adhesive layer arranged to bond said each thermally conductive layer to the heat-emission layer.

5. The radiator according to claim 1, further comprising one or more layer-securing units configured to mechanically fix each of the thermally conductive layers in place, said layer-securing units being disposed in or on the stack at one or more distances away from the heat transfer clamping bracket.

6. The radiator according to claim 1, wherein at least one of said thermally conductive layers includes a pyrolytic graphite sheet.

7. The radiator according to claim 1, wherein the radiator includes at least two instances of the stack of layers, each stack instance being thermally coupled to the heat transfer clamping bracket at the first end of the respective stack.

8. The radiator according to claim 1, further comprising one or more supporting brackets coupled at a first end thereof to the heat transfer clamping bracket and arranged along a length of the stack of thermally conductive layers, the one or more structurally supporting brackets supporting the stack of thermally conductive layers in a predetermined orientation.

9. A radiator comprising:

at least two thermally conductive layers arranged in at least first and second stacks of layers; and a heat transfer clamping bracket operably coupled to a first end of the layers of the stack and configured to deliver heat from a heat source to said layers, the heat transfer clamping bracket having a heat source receiving portion configured to thermally couple with a heat source, the heat transfer clamping bracket being configured to clamp said layers together proximal to said heat source, wherein the stack of layers has a tapered overall shape in cross section due to sequentially shorter lengths of the thermally conductive layers exposing a second end of each layer to a surrounding environment for heat rejection, a total thickness of the stack diminishing with distance away from said heat transfer clamping bracket, and each of the first and second stacks of layers is thermally coupled to the heat transfer clamping bracket at respective first ends of the first and second stacks of layers, the first stack of layers being oriented from the heat transfer clamping bracket in a first direction and the second stack of layers being oriented from the heat transfer clamping bracket in a second direction different from the first direction.

10. The radiator according to claim 9, further including, on at least a portion of a surface of each thermally conductive layer, a heat-emission layer wherein the heat-emission layer has an exposed surface with an emissivity of at least 0.7.

11. The radiator according to claim 10, further comprising an adhesive layer arranged to bond said each thermally conductive layer to said heat-emission layer.

12. The radiator according to claim 9, further comprising one or more layer-securing units configured to mechanically fix each of the thermally conductive layers in place, said layer-securing units being disposed in or on the stack at one or more distances away from the heat transfer clamping bracket.

13. The radiator according to claim 9, further comprising one or more layer-securing units configured to mechanically fix said thermally conductive layers to each other, said one or more layer-securing units being disposed in or on the stack at one or more distances away from said heat transfer clamping bracket, wherein each layer-securing unit attaches to the heat transfer clamping bracket that clamps said thermally conductive layers.

14. The radiator according to claim 9, wherein at least a portion of the heat transfer clamping bracket is composed of aluminum.

15. The radiator according to claim 9, wherein the heat transfer clamping bracket is formed at least in part from a resiliently compliant material and positioned to apply force against the stack of thermally conductive layers, the force corresponding to an amount of compliance of the resiliently compliant material against the stack of conductive layers.

16. The radiator according to claim 9, wherein at least one of said thermally conductive layers includes a pyrolytic graphite sheet.

17. The radiator according to claim 9, wherein the at least first and second stacks of layers and the heat transfer clamping bracket are arranged substantially in a common plane.

18. The radiator according to claim 9, wherein at least one of said thermally conductive layers is composed of aluminum.

19. The radiator according to claim 9, wherein the thermally conductive layers are disposed having a distance less than 400 μm between adjacent thermally conductive layers.

20. A radiator comprising:

at least two thermally conductive layers arranged in a stack of layers; and a heat transfer clamping bracket operably coupled to a first end of the layers of the stack and configured to deliver heat from a heat source to said layers, the heat transfer clamping bracket having a heat source receiving portion configured to thermally couple with a heat source, the heat transfer clamping bracket being configured to clamp said layers together proximal to said heat source, wherein the stack of layers has a tapered overall shape in cross section due to sequentially shorter lengths of the thermally conductive layers exposing a second end of each layer to a surrounding environment for heat rejection, a total thickness of the stack diminishing with distance away from said heat transfer clamping bracket, and the stack of layers includes a number of the thermally conductive layers arranged on respective sides of one or more central layers, in a mutually tapered cross section such that a length of the one or more central layers of the thermally conductive layers is longer, from the first end of the one or more central layers to the second end of the one or more central layers, than a length of adjacent layers, of the thermally conductive layers arranged on respective sides of the one or more central layers.

21. The radiator according to claim 20, wherein the thermally conductive layers arranged on respective sides of the central layer include at least one pair of thermally conductive layers arranged symmetrically about the one or more central layers and having a common length with each other.

* * * * *